(12) United States Patent
Lin et al.

(10) Patent No.: US 11,048,154 B2
(45) Date of Patent: Jun. 29, 2021

(54) LIGHT SOURCE MODULE AND PROJECTOR WITH FAN AND DRIVER

(71) Applicant: Qisda Corporation, Taoyuan (TW)

(72) Inventors: Chi-Cheng Lin, Taoyuan (TW); Po-Fu Wu, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/822,742

(22) Filed: Mar. 18, 2020

(65) Prior Publication Data
US 2020/0310231 A1 Oct. 1, 2020

(30) Foreign Application Priority Data
Mar. 29, 2019 (CN) .......................... 201910247777.0

(51) Int. Cl.
| | |
|---|---|
| *G03B 21/16* | (2006.01) |
| *G03B 21/20* | (2006.01) |
| *H04N 9/31* | (2006.01) |
| *G03B 21/00* | (2006.01) |

(52) U.S. Cl.
CPC .......... *G03B 21/16* (2013.01); *G03B 21/204* (2013.01); *H04N 9/3144* (2013.01); *G03B 21/008* (2013.01)

(58) Field of Classification Search
CPC ..... G03B 21/16; G03B 21/204; H04N 9/3144
See application file for complete search history.

(56) References Cited

U.S. PATENT DOCUMENTS

| | | | | |
|---|---|---|---|---|
| 6,227,686 | B1* | 5/2001 | Takahashi | G03B 21/16 362/345 |
| 9,305,857 | B2* | 4/2016 | Fukano | H01L 23/38 |
| 9,664,893 | B2* | 5/2017 | Yamagishi | G03B 21/204 |
| 9,915,418 | B2* | 3/2018 | Yamagishi | F21V 29/745 |
| 9,933,693 | B2* | 4/2018 | Aoki | G03B 21/204 |
| 9,983,467 | B2* | 5/2018 | Kitade | G02B 26/008 |
| 10,520,800 | B2* | 12/2019 | Ikeo | H04N 9/3111 |
| 10,809,604 | B2* | 10/2020 | Yoshikawa | G03B 21/16 |
| 2015/0131062 | A1* | 5/2015 | Nishimori | F21V 14/08 353/84 |

(Continued)

FOREIGN PATENT DOCUMENTS

| | | |
|---|---|---|
| CN | 204425365 U | 6/2015 |
| CN | 204929006 U | 12/2015 |
| CN | 205103489 U | 3/2016 |

*Primary Examiner* — Bao-Luan Q Le

(57) ABSTRACT

A light source module for providing an illumination light is presented. The light source module comprises a case, a light source, at least one first fan blade, a wavelength transforming unit and a driver. The case has an accommodation space, and the light source provides an excitation light to the accommodation space. The first fan blade and the wavelength transforming unit are disposed in the accommodation space. The wavelength transforming unit receives the excitation light from the light source. The excitation light is transformed into the illumination light through the wavelength transforming unit. The driver includes a driving shaft and a stator for rotating the driving shaft. The stator is located outside the accommodation space. The driving shaft passes through the case and connects to at least one first fan blade. A first air flow is generated by the first fan blade driven by the stator rotating the driving shaft. The first air flow flows inside the case. A projector is also provided.

11 Claims, 2 Drawing Sheets

(56) References Cited

U.S. PATENT DOCUMENTS

| | | | |
|---|---|---|---|
| 2015/0355533 A1* | 12/2015 | Masuda | H01S 5/02469 |
| | | | 353/52 |
| 2016/0077326 A1* | 3/2016 | Yamagishi | G02B 7/008 |
| | | | 353/61 |
| 2017/0010523 A1* | 1/2017 | Egawa | H04N 9/3144 |
| 2017/0175989 A1* | 6/2017 | Yamagishi | F21V 9/30 |
| 2017/0205692 A1* | 7/2017 | Aoki | G03B 21/16 |
| 2017/0261844 A1* | 9/2017 | Kitade | G03B 21/16 |
| 2017/0277029 A1* | 9/2017 | Chang | B32B 17/00 |
| 2018/0143518 A1* | 5/2018 | Tsai | G02B 27/0006 |
| 2019/0094671 A1* | 3/2019 | Ikeo | G02B 26/008 |
| 2019/0146314 A1* | 5/2019 | Yoshikawa | G03B 21/16 |
| | | | 362/84 |

* cited by examiner

LIGHT SOURCE MODULE AND PROJECTOR WITH FAN AND DRIVER

BACKGROUND OF THE INVENTION

1. Field of the Invention

The present invention discloses an optical equipment and an optical device, in particular, the present invention discloses a light source module and a projector.

2. Description of the Prior Art

With the progress of optical technologies, solid-state light source having high brightness and high intensity has been applied to projectors to provide a high intensity image. With a laser light source, e.g. laser diode, and a phosphor wheel which is used for transforming wavelength of lights, the projector can project a colorful image to a screen at a distance, and it can even project to a large-sized screen. The aforementioned projector has been used in, for example, performing venues, movie theaters or large-scale conferences.

However, a light provided by the high brightness light source illuminating the phosphor wheel will generate a large amount of heat. To prevent damage to the phosphor wheel, the optical engine accommodating the phosphor wheel needs to have a design with good heat dissipation.

Some cooling designs of conventional optical engines involve installing fans to the optical engines to generate an air flow to cool down the phosphor wheel. However, the motor of the fan also creates heat. And because the optical engine is airtight or almost airtight, the heat cannot be dissipated. Hence, the fan in the optical engine has to be made out of heat-resistant materials of higher cost. Additionally, to enhance cooling effect, the optical engine has to be integrated with heat sink, which will further enlarge the size of the optical engine.

SUMMARY OF THE INVENTION

The present invention discloses a light source module with a reduced volume which maintains a good heat dissipation performance.

The present invention discloses a projector having a smaller volume which outputs a high intensity image light.

An embodiment of the present invention discloses a light source module for providing an illumination light. The light source module comprises a case, a light source, at least one first fan blade, a wavelength transforming unit and a driver. The case has an accommodation space, and the light source provides an excitation light to the accommodation space. The first fan blade and the wavelength transforming unit are disposed in the accommodation space. The wavelength transforming unit receives the excitation light from the light source. The excitation light is transformed into illumination light through the wavelength transforming unit. The driver includes a driving shaft and a stator for rotating the driving shaft. The stator is located outside the accommodation space. The driving shaft passes through the case and connects to at least one first fan blade. A first air flow is generated by the first fan blade driven by the stator rotating the driving shaft. The first air flow flows inside the case.

In an embodiment, the aforementioned light source is a laser light source.

In an embodiment, an output power of the aforementioned laser light source is substantially in the range between 115 W and 250 W.

In the embodiment, the light source module further comprises at least one second fan blade. The second fan blade is located outside the accommodation space, and the driver is simultaneously connected to the first fan blade and the second fan blade through the driving shaft. The second fan blade is located between the stator and the case. A second air flow is generated by the second fan blade driven by the stator rotating the driving shaft. The second air flow flows to an outer surface of the case.

In an embodiment, the light source module further comprise at least one third fan blade. The third fan blade is located outside the accommodation space, and the driver is simultaneously connected to the first fan blade and the third fan blade through the driving shaft. The stator is located between the third fan blade and the case. A third air flow is generated by the third fan blade driven by the stator rotating the driving shaft. The third air flow flows to an outer surface of the case.

An embodiment of the present invention discloses a projector comprising a digital micromirror device and a light source module. The light source module provides an illumination light to the digital micromirror device to form an image light. The light source module includes a case, a light source, at least one first fan blade, a wavelength transforming unit and a driver. The case has an accommodation space. The light source provides an excitation light. The first fan blade and the wavelength transforming unit are arranged in the accommodation space. The wavelength transforming unit receives the excitation light from the light source. The excitation light is transformed into an illumination light via the wavelength transforming unit. The driver includes a driving shaft and a stator for rotating the driving shaft. The stator is located outside the accommodation space. The driving shaft passes through the case and connects to the first fan blade. A first air flow is generated by the first fan blade driven by the stator rotating the driving shaft. The first air flow flows inside the case.

In an embodiment, the aforementioned light source is a laser light source.

In an embodiment, the output power of the aforementioned laser light source is substantially in the range between 115 W and 250 W.

In an embodiment, the aforementioned light source module further comprises at least one second fan blade. The second fan blade is located outside the accommodation space. The driver is simultaneously connected to the first fan blade and the second fan blade via the driving shaft. The second fan blade is located between the stator and the case. A second air flow is generated by the second fan blade driven by the stator rotating the driving shaft. The second air flow flows to an outer surface of the case.

In an embodiment, the aforementioned light source module further comprises at least one third fan blade. The third fan blade is located outside the accommodation space, and the driver is simultaneously connected to the first fan blade and the third fan blade via the driving shaft. The stator is located between the third fan blade and the case. A third air flow is generated by the third fan blade driven by the stator rotating the driving shaft. The third air flow flows to an outer surface of the case.

As mentioned above, the light source module disclosed in the embodiments of the present invention cools down the temperature of the wavelength transforming unit with the first fan blade and reduces the size of the case. The projector disclosed in the embodiments of the present invention comprises the aforementioned light source module, thus the overall size can be reduced.

DETAILED DESCRIPTION OF THE PREFERRED EMBODIMENT

The disclosed light source module and projector could be used in a home or commercial projector to reduce the size of the projector. Preferably, it could be used in projectors which provide projection images with high intensity illumination. However, the present invention is not limited to the types of projector in which the light source model and projection device can be used.

It should be understood that, even though the terms such as "first", "second", "third" may be used to describe an element, a part, a fan blade, a flow and/or a portion in the present specification, but these elements, parts, fan blades, flows and/or portions are not limited by such terms. Such terms are merely used to differentiate an element, a part, a fan blade, a flow and/or a portion from another element, part, region, layer and/or portion. Therefore, in the following discussions, a first element, part, fan blade, flow and/or portion may be called a second element, part, fan blade, flow and/or portion, and do not depart from the teaching of the present disclosure.

Figure 1A:
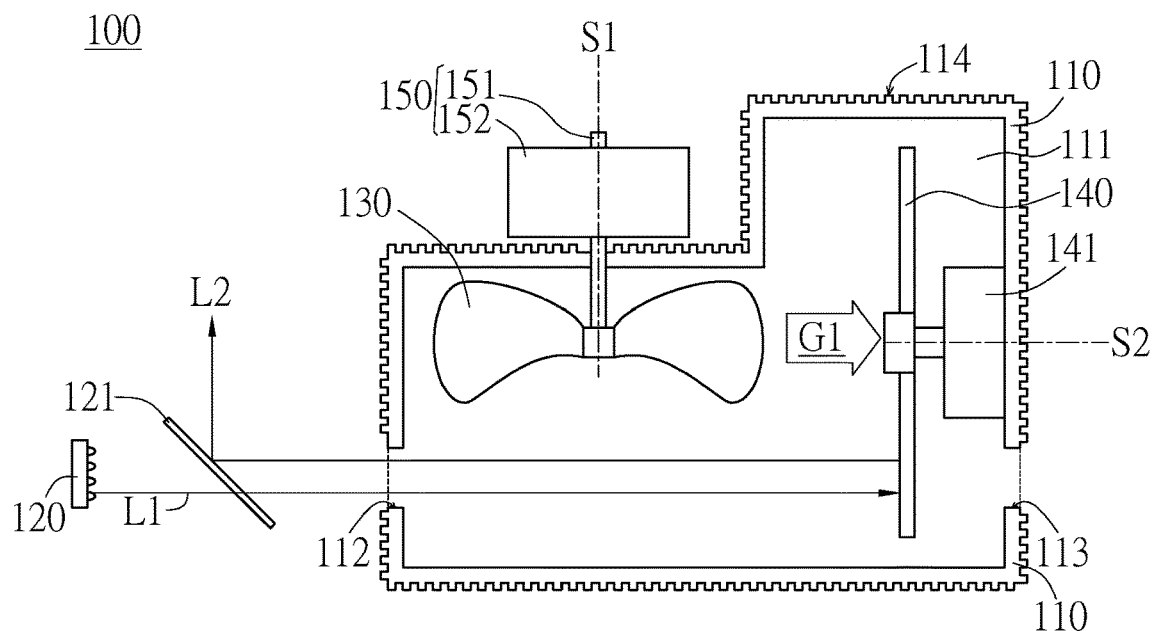
FIG. 1A is a schematic of the light source module according to the first embodiment of the present invention.

FIG. 1A is a schematic of the light source module according to the first embodiment of the present invention. Refer to FIG. 1A. The light source module 100 of the embodiment provides the illumination light L2. The light source module 100 comprises the case 110, the light source 120, the first fan blade 130, the wavelength transforming unit 140 and the driver 150. The case 110 has the accommodation space 111. More specifically, since the wavelength transforming unit 140 is a precision optical element, it is preferred that the accommodation space 111 forms a closed space to improve dustproof efficiency and prevent dusts in the external environment from affecting the wavelength transforming unit 140. The light source 120 provides the excitation light L1 to the accommodation space 111. In the embodiment, the light source module 100 further comprises the dichroic mirror 121. The dichroic mirror 121 is, for example, suitable for allowing the excitation light L1 provided by the light source 120 to pass and for reflecting lights of other wavelengths to provide a light path for transmitting light between the light source 120 and the case 110. In other embodiments, the non-dichroic mirror 121 design of the light path can be provided by incident lights with different incident angles. Furthermore, one can use other reflectors, curved mirrors, lens, prisms or dichroic mirrors to design the light path between the light source 120 and the case 110. Yet, the disclosed invention is not limited by this.

In this embodiment, the first fan blade 130 and the wavelength transforming unit 140 are arranged in the accommodation space 111. The air in the accommodation space 111 can be driven by the first fan blade 130 to average the temperature in the accommodation space 111. The wavelength transforming unit 140 receives the excitation light L1 from the light source 120. The excitation light L1 is transformed into the illumination light L2 by the wavelength transforming unit 120. It should be noted that the illumination light provided by the light source module 100 according to the embodiment substantially includes the light L2 transformed by the wavelength transforming unit 140 and the light not transformed by the wavelength transforming unit 140. For clarification purposes, the embodiment will use the transformed light as an example; however, the example does not intend to limit the illumination light of the present invention. In the embodiment, the light source 120 is, for example, a solid-state light source, more specifically, a laser diode. In an embodiment, the light source in the light source module can also be a light emitting diode or other light emitting components.

The driver 150 of the first embodiment includes a driving shaft 151 and a stator 152 configured to rotate the driving shaft 151. In the embodiment, the driver 150 is, for example, a motor. The stator 152 is located outside the accommodation space 111. The driving shaft 151 passes through the case 110 and connects to the first fan blade 130. The first air flow G1 is generated by the first fan blade 130 driven by the stator 152 rotating the driving shaft 151. The first air flow G1 flows in the case 110 to average the temperature inside the accommodation space 111. Because the stator 152 is located outside the case 110, the driver 150 can drive the first fan blade 130 to generate the first air flow G1 to avoid heat accumulating in the wavelength transforming unit 140. In the meanwhile, when the driver 150 is working, the temperature generated by the stator 152 will not affect the temperature inside the accommodation space 111. On the other hand, because only the driving shaft 151 of the driver 150 is extended into the accommodation space 111, the size of the case 110 can be further reduced. In addition, the wavelength transforming unit will not be damaged due to high inner temperature.

More specifically, in the first embodiment of the present invention, the output power of the light source 120 is substantially in the range of 115 W to 250 W. In the embodiment, the case 110 includes the openings 112 and 113. The excitation light L1 emitted by the light source 120 transmits into the accommodation space 111 of the case 110 through the opening 112. The excitation light L1 passing through the wavelength transforming unit 140 can pass through the opening 113. More specifically, in the embodiment, the openings 112, 113 formed on the case 110 is, for example, covered by glass or other transparent materials (shown by the dashed lines). In an embodiment, the dustproof performance of the light source module can be further improved by using a transparent window formed by other transparent materials.

In the first embodiment of the specification, the wavelength transforming unit 140 is, for example, a phosphor wheel. The light source module 100 further includes the driver 141. The wavelength transforming unit 140 is driven by the driver 141 to rotate around the axis S2. The wavelength transforming unit 140 further includes, for example, a passing area and at least one fluorescent powder area. When the wavelength transforming unit 140 rotates around the axis S2, the passing area and the fluorescent powder area will cut into the light path of the excitation light L1. In an embodiment, the wavelength transforming unit can further include quantum dots. However the present invention is not limited to the aforementioned embodiment.

Furthermore, in the first embodiment, the driver 141 is arranged in the accommodation space 111; however, this invention is not limited thereto. In an embodiment, the driver rotating the wavelength transforming unit can be arranged outside of the case. The driver is extended by a driving shaft and drives the wavelength transforming unit to rotate.

In the first embodiment, when the wavelength transforming unit 140 transforms the excitation light L1 into the illumination light L2, the heat produced from the procedure will be dissipated by the first air flow G1 generated by the first fan blade 130 rotating around the axis S1 to maintain the temperature of the wavelength transforming unit 140 in a safe region. The material of the first fan blade 130 is, for example, plastic. The safe region of the temperature of the wavelength transforming unit 140 is below 150° C.

On the other hand, the size of the light source module 100 can be reduced using the design of the driver 150 and the first fan blade 130. Since the volume of the light source module 100 is in the range between 500 to 800 cm3, the light source module 100 can be used in a small scale projector. In the embodiment, the heat dissipation structure 114 is formed on the outer surface of the case 110. The heat dissipation structure 114 dissipates the heat from the accommodation space 111 to the outside of the case 110.

Figure 1B:
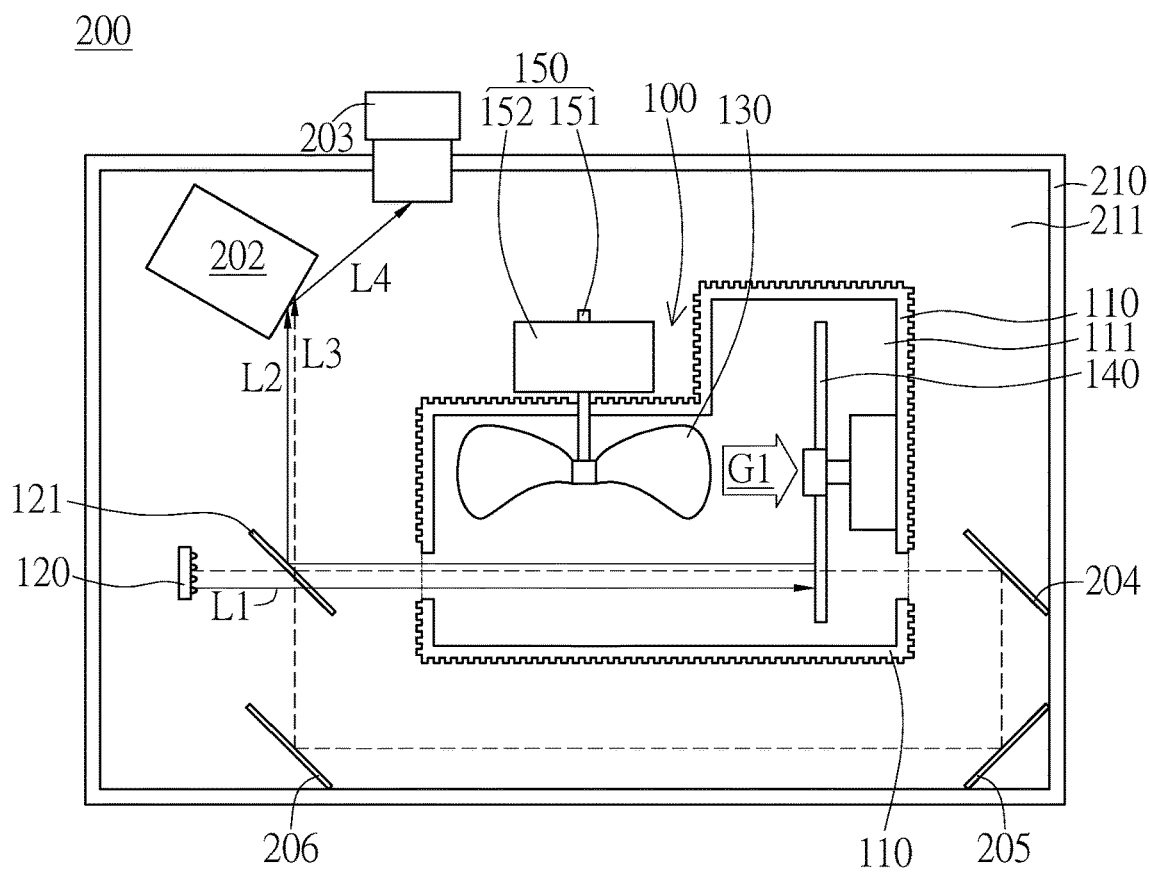
FIG. 1B is a schematic of the projector according to the first embodiment of the present invention.

This paragraph will further disclose the present projector according to the light source module 100. FIG. 1B is the schematic of the projector according to the first embodiment. Refer to FIG. 1B. The projector 200 comprises the light source module 100 and digital micromirror device (DMD) 202. For clarification purposes, the FIG. 1B only shows part of components as an example. The relative relationship between components will be shown in the FIG. 1B. A person in the art can further utilize prisms or other light-combining element to form a light path located between the light source module 100 and the DMD 202. The positions of each component in the figure are not intended to limit the invention.

As mentioned above, in the first embodiment, the wavelength transforming unit 140 of the light source module 100 transforms the excitation light L1 into the illumination light L3 during the rotation procedure of the wavelength transforming unit 140, or directly allows the light from the light source 120 to pass through the wavelength transforming unit 140 to form the illumination light L3. In other words, the other portion of the illumination light L3 (shown by the dashed lines) is substantially the light emitted from the light source 120 and passing through the wavelength transforming unit 140. Hence, the illumination light provided by the light source module 100 substantially includes the illumination light L2 and the illumination light L3. In the embodiment, the DMD 202 of the projector 200 receives the illumination light L2 and the illumination light L3 to form the image light L4. The image light L4 will be projected on a screen to form an image.

With the design of the driver 150, the size of case 110 of the light source module 100 can be further reduced. Therefore, the size of the projector 200 can be further reduce too.

More specifically, in the first embodiment, the projector 200 comprises the case 210. The case 210 provides the accommodation space 211. The light source module 100 is arranged in the accommodation space 211. The projector 200 further comprises the camera lens 203 and reflecting mirror 204-206. Wherein illumination light L3 passing through the wavelength transforming unit 140 is sequentially reflected by the reflecting mirror 204, reflecting mirror 205 and the reflecting mirror 206 and transmitted to the dichroic mirror 121. Similar to illumination light L2, the illumination light L3 can be transmitted to the DMD 202. In other words, in the embodiment, the dichroic mirror 121 can work as a light-combining element in the projector 200. When the dichroic mirror 121 works as the light-combining element, lights with different colors are sequentially reflected by the DMD 202 and forms the image light L4. The image light L4 is projected to a site with a proper distance and forms an image via the camera lens 203. However, the light path of the present invention is not limited to being formed by the reflecting mirror 204-206, the dichromic mirror 121, the DMD 202 and the camera lens. In an embodiment, the light path can be adjusted as necessary to use the illumination light provided by the light source module 100 to form an image light.

Figure 2:
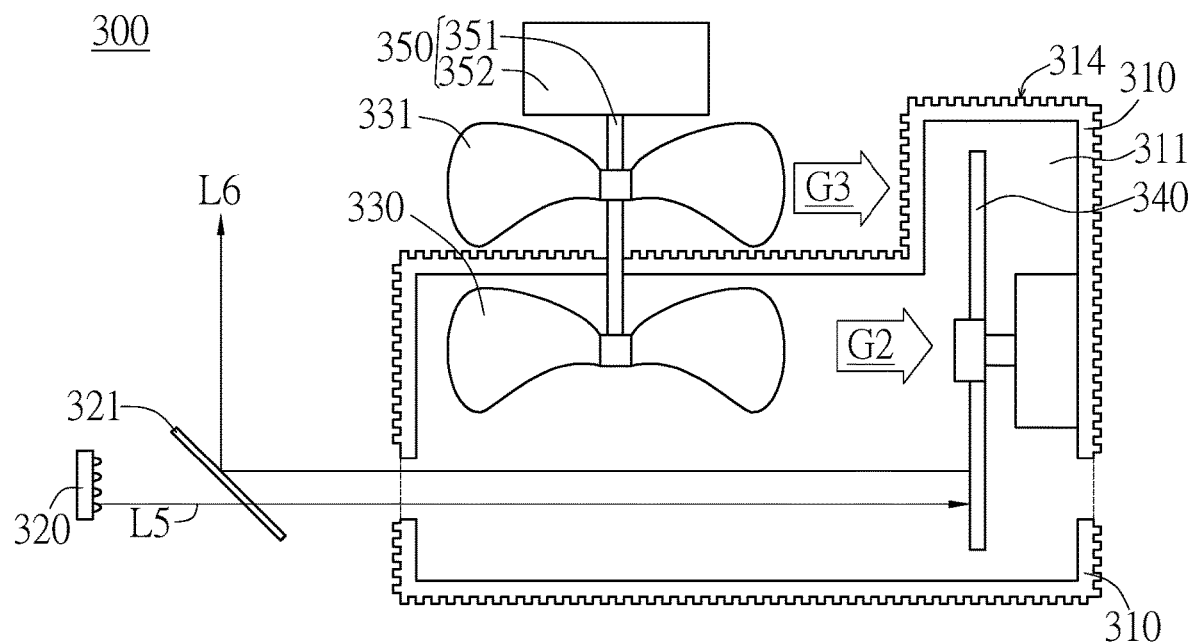
FIG. 2 is a schematic of the light source module according to the second embodiment of the present invention.

In an embodiment, there are other designs for the fan blade connected to the driver. FIG. 2 is a schematic of the light source module according to the second embodiment. Refer to FIG. 2. In the second embodiment, similar to the light source module 100, the light source module 300 comprises case 310 and light source 320. The first fan blade 330 and the wavelength transforming unit 340 are arranged in the accommodation space 311 provided by the case 310. The first fan blade 330 is driven by the driving shaft 351 rotated by the driver 350 using the stator 352. The first air flow G2 generated by the first fan blade 330 is provided to the wavelength transforming unit 340. The heat dissipation structure 314 formed outside the case 310 is used to help the heat to dissipate from the accommodation space 311. Furthermore, the excitation light L5 emitted from the light source 320 is transmitted to the accommodation space 311 through the dichroic mirror 321. The illumination light L6 emitted from the accommodation space 311 is reflected by the dichroic mirror 321 for subsequent applications. However, the present invention is not limited to using the dichroic mirror 321 to provide the light path between the light source 320 and the case 310. In an embodiment, the light path between the light source and the case can be provided by adjusting the angle of the injecting light or using other optical components.

Different from the first embodiment, in the second embodiment, the light source module 300 further comprises the second fan blade 331. The second fan blade 331 is located outside the accommodation space 311. The driver 350 is simultaneously connected to the first fan blade 330 and the second fan blade 331 via the driving shaft 351. The second fan blade 331 is located between the stator 352 and case 310. The second airflow G3 is generated by the second fan blade 331 rotated by the driving shaft 351 driven by the stator 352. The second airflow G3 flows to the outer surface of the case 310. In other words, the second fan blade 331, the case 310 and the heat dissipation structure 314 formed on the outer surface of the case 310 can be used to cool down the temperature to improve the heat dissipation performance of the light source module 300. At the same time, the stator 352 located outside the case 310 will not increase the temperature inside the case 310.

Figure 3:
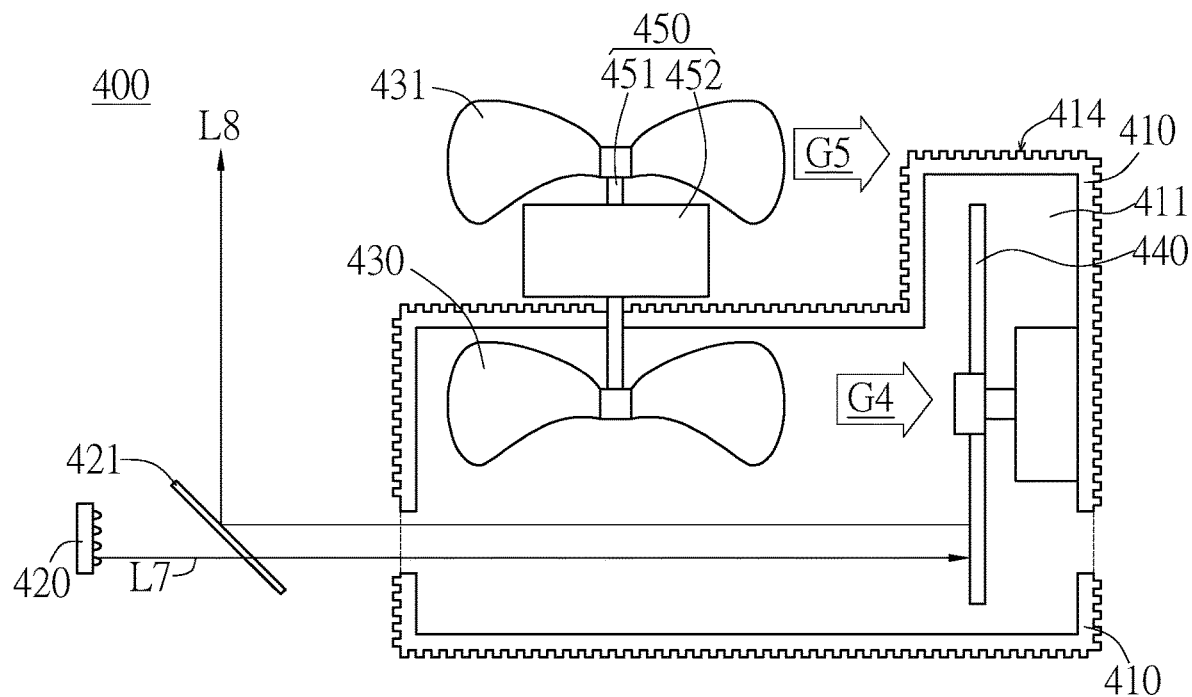
FIG. 3 is a schematic of the light source module according to the third embodiment of the present invention.

FIG. 3 is a schematic of the light source module according to the third embodiment. Refer to FIG. 3. In the third embodiment, similar to the light source module 100, the light source module 400 comprises the case 410 and the light source 420. The first fan blade 430 and the wavelength transforming unit 440 are arranged in the accommodation space 411 provided by the case 410. The driver 450 is arranged outside the case 410. The first air flow G4 is generated by the first fan blade 430 driven by the driving shaft 451 rotated by the driver 450 using the stator 452 and provided to the wavelength transforming unit 440. The heat dissipation structure 414 formed outside the case 410 is used to help the heat to dissipate from the accommodation space 411. Additionally, in the embodiment, excitation light L7 emitted from the light source 420 transmits to the accommodation space 411 through the dichroic mirror 421. The illumination light L8 emitted from the accommodation space 311 is reflected by the dichroic mirror 421 for subsequent applications. However, the present invention is not limited to using the dichroic mirror 421 to provide the light path between the light source 420 and the case 410. In an embodiment, the light path between the light source and the case can be provided by adjusting the angle of the injecting light or using other optical components.

Different from the first embodiment, in the third embodiment, the light source module 400 further comprises the third fan blade 431. The third fan blade 431 is located outside the accommodation space 411. The driver 450 is simultaneously connected to the first fan blade 430 and the third fan blade 431 via the driving shaft 451. The stator 452 is located between the third fan blade 431 and the case 410. The third air flow G5 is generated by the rotation of the third fan blade 431 driven by the driving shaft 451 rotated by the stator 452. The third air flow G5 flows to the outer surface of the case 410. In other words, the third fan blade 431, the case 410 and the heat dissipation structure 414 formed on the outer surface of the case 410 can be used for cooling down the temperature to improve the heat dissipation performance of the light source module 400. At the same time, the stator 452 located outside the case 410 will not increase the temperature inside the case 410.

In other embodiment, the light source module further includes the second fan blade and the third fan blade at the same time. The present invention is not limited by the light source 300 to the second embodiment and the light source 400 to the third source embodiment.

As mentioned above, the first fan blade can reduce the temperature of the wavelength transforming unit arranged in the case of the presented light source module. At the same time, the first fan blade can be driven by the driving shaft extended to the case. Hence, the size of the case can be reduced by moving the driver outside the case. Because the presented projector comprises the aforementioned light source module, the size of the presented projector can be reduced.

What is claimed is:

1. A light source module providing an illumination light comprising:
    a case having an accommodation space;
    a light source providing an excitation light to the accommodation space;
    at least one first fan blade arranged in the accommodation space;
    a wavelength transforming unit, arranged in the accommodation space and configured to receive the excitation light from the light source and to transform the excitation light to the illumination light;
    a driver including a driving shaft and a stator, the stator configured to rotate the driving shaft and located outside the accommodation space, the driving shaft passing through the case and connected to the first fan blade, the stator rotating the driving shaft to drive the first fan blade to rotate and generate a first air flow flowing in the case; and
    at least one second fan blade located outside the accommodation space, wherein the driver is connected to the first fan blade and the second fan blade by the driving shaft.

2. The light source module according to claim 1, wherein the light source is a laser light source.

3. The light source module according to claim 2, wherein an output power of the laser light source is substantially in a range of 115 W to 250 W.

4. The light source module according to claim 1, wherein the second fan blade is located between the stator and the case, and the stator rotates the driving shaft to drive the second fan blade to rotate and generates a second air flow flowing to an outer surface of the case.

5. The light source module according to claim 1, wherein the stator is located between the second fan blade and the case, the stator rotates the driving shaft to drive the second fan blade to rotate and generate a third air flow flowing to an outer surface of the case.

6. A projector comprising:
    a digital micromirror device; and
    a light source module providing an illumination light to the digital micromirror device to form an image light, wherein the light source module includes:
    a case having an accommodation space;
    a light source providing an excitation light to the accommodation space;
    at least one first fan blade arranged in the accommodation space;
    a wavelength transforming unit, arranged in the accommodation space and configured to receive the excitation light from the light source and transform the excitation light to the illumination light; and
    a driver including a driving shaft and a stator, the stator configured to rotate the driving shaft and located outside the accommodation space, the driving shaft passing through the case and connected to the first fan blade, the stator rotating the driving shaft to drive the first fan blade to rotate and generate a first air flow flowing in the case; and
    at least one second fan blade located outside the accommodation space, wherein the driver is connected to the first fan blade and the second fan blade by the driving shaft, the second fan blade is located between the stator and the case, and the stator rotates the driving shaft to drive the second fan blade to rotate and generate a second air flow flowing to an outer surface of the case.

7. The projector according to claim 6, wherein the light source is a laser light source.

8. The projector according to claim 7, wherein an output power of the laser light source is substantially in a range of 115 W to 250 W.

9. A projector comprising:
    a digital micromirror device; and
    a light source module providing an illumination light to the digital micromirror device to form an image light, wherein the light source module includes:
    a case having an accommodation space;
    a light source providing an excitation light to the accommodation space;
    at least one first fan blade arranged in the accommodation space;
    a wavelength transforming unit, arranged in the accommodation space and configured to receive the excitation light from the light source and transform the excitation light to the illumination light; and a driver including a driving shaft and a stator, the stator configured to rotate the driving shaft and located outside the accommodation space, the driving shaft passing through the case and connected to the first fan blade, the stator rotating the driving shaft to drive the first fan blade to rotate and generate a first air flow flowing in the case; and at least one third fan blade located outside the accommodation space, wherein the driver is connected to the first fan blade and the third fan blade by the driving shaft, the stator is located between the third fan blade and the case, the stator rotates the driving shaft to drive the third fan blade to rotate and generate a third air flow flowing to an outer surface of the case.

10. The projector according to claim 9, wherein the light source is a laser light source.

11. The projector according to claim 10, wherein an output power of the laser light source is substantially in a range of 115 W to 250 W.

* * * * *